United States Patent
Franke et al.

(10) Patent No.: US 10,770,832 B2
(45) Date of Patent: Sep. 8, 2020

(54) ELECTRIC CABLE SUBASSEMBLY

(71) Applicant: Phoenix Contact GmbH & Co. KG, Blomberg (DE)

(72) Inventors: Jens Franke, Bad Pyrmont (DE); Stefan Galla, Löhne (DE); Sebastian Scholz, Höxter (DE); Martin Schaefers, Paderborn (DE); Sebastian Schaefer, Blomberg (DE); Andreas Beck, Polle (DE); Markus Potthast, Marienmünster (DE); Valentin Gutbrot, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 15/755,355

(22) PCT Filed: Aug. 23, 2016

(86) PCT No.: PCT/EP2016/069865
§ 371 (c)(1),
(2) Date: Feb. 26, 2018

(87) PCT Pub. No.: WO2017/032762
PCT Pub. Date: Mar. 2, 2017

(65) Prior Publication Data
US 2018/0248306 A1    Aug. 30, 2018

(30) Foreign Application Priority Data

Aug. 27, 2015 (DE) .................. 10 2015 114 289
Feb. 12, 2016 (DE) .................. 10 2016 102 490

(51) Int. Cl.
*H01R 13/58* (2006.01)
*H01R 13/504* (2006.01)
(Continued)

(52) U.S. Cl.
CPC ....... *H01R 13/5825* (2013.01); *H01R 13/504* (2013.01); *H01R 13/5205* (2013.01);
(Continued)

(58) Field of Classification Search
CPC ..... H01L 31/0508; H01R 9/03; H01R 13/516; H01R 13/502; H01R 13/5825; H01R 13/5205; G02B 6/3829
(Continued)

(56) References Cited

U.S. PATENT DOCUMENTS 3,602,872 A * 8/1971 Braunstein ........... H01R 4/2404
439/425
3,883,208 A * 5/1975 Sankey .................. H01R 13/53
439/101
(Continued)

FOREIGN PATENT DOCUMENTS

CN    103582986 A    2/2014
DE    112006002980 T5    10/2008
(Continued)

OTHER PUBLICATIONS

International Search Report and Written Opinion, Int. Serial No. PCT/EP2016/069865, Int. Filing Date: Aug. 23, 21016, Applicant: Phoenix Contact GmbH & Co. KG, dated Oct. 25, 2018.
(Continued)

*Primary Examiner* — Abdullah A Riyami
*Assistant Examiner* — Marcus E Harcum
(74) *Attorney, Agent, or Firm* — Reising Ethington PC

(57) ABSTRACT

The present disclosure relates to an electrical cable assembly with a connector, in particular a trunk line cable assembly for a photovoltaic system, and to an assembly consisting of a module inverter and the trunk line cable assembly connected thereto, and also relates to a photovoltaic system comprising a plurality of photovoltaic modules and module
(Continued)

inverters and AC side cabling between the module inverters and the trunk line cable assemblies, wherein the drop lines are connected to the trunk line cable by means of the connector, wherein the junction is enclosed by a two-piece connector housing which includes strain relief means for the trunk line cable and is optionally additionally overmolded.

29 Claims, 9 Drawing Sheets

(51) Int. Cl.
*H01R 13/52* (2006.01)
*H01R 13/59* (2006.01)
*H02G 1/14* (2006.01)
*H02G 15/007* (2006.01)
*H02G 15/013* (2006.01)
*H02G 15/113* (2006.01)
*H02G 15/115* (2006.01)
*H02G 15/117* (2006.01)

(52) U.S. Cl.
CPC .............. *H01R 13/59* (2013.01); *H02G 1/14* (2013.01); *H02G 15/007* (2013.01); *H02G 15/013* (2013.01); *H02G 15/113* (2013.01); *H02G 15/115* (2013.01); *H02G 15/117* (2013.01)

(58) Field of Classification Search
USPC .................. 439/457, 459, 460, 465, 731
See application file for complete search history.

(56) References Cited

U.S. PATENT DOCUMENTS

| | | | | |
|---|---|---|---|---|
| 4,108,527 A * | 8/1978 | Douty | ................ | H01R 13/5825 439/465 |
| 4,571,018 A * | 2/1986 | Annoot | .............. | H01R 13/5205 439/275 |
| 5,588,870 A * | 12/1996 | Boteler | ................ | H01R 13/502 439/467 |
| 5,774,980 A * | 7/1998 | Klein | ................. | H01R 13/5825 29/857 |
| 5,911,600 A * | 6/1999 | Mosquera | .............. | H01R 31/02 439/655 |
| 6,083,031 A * | 7/2000 | Kuo | ................... | H01R 13/6215 439/362 |
| 6,422,891 B1 * | 7/2002 | Huang | .................... | F21V 23/06 362/249.01 |
| 6,641,429 B1 * | 11/2003 | Wu | ........................ | H01R 9/032 439/465 |
| 6,840,739 B2 * | 1/2005 | Cortez | .................... | F04D 29/34 416/210 R |
| 6,984,151 B2 * | 1/2006 | Wu | ........................ | H01R 9/032 439/352 |
| 7,572,140 B2 * | 8/2009 | Szelag | ................. | H01R 4/2433 439/405 |
| 8,435,063 B2 * | 5/2013 | Wiest | ..................... | H01L 31/05 439/354 |
| 8,512,069 B2 * | 8/2013 | Kao | ..................... | H01R 13/506 439/106 |
| 8,870,590 B2 * | 10/2014 | Hung | ..................... | H01R 4/021 174/112 |
| 8,961,219 B2 * | 2/2015 | Maranto | ............ | H01R 13/5829 439/467 |
| 8,979,597 B2 * | 3/2015 | Starke | ..................... | H01R 43/24 439/701 |
| 10,008,812 B1 * | 6/2018 | Hamner | ............. | H01R 13/6586 |
| 2006/0180196 A1 * | 8/2006 | Lares | ....................... | H01R 4/70 136/251 |
| 2008/0137377 A1 * | 6/2008 | Brengartner | .......... | F21V 21/002 362/640 |
| 2009/0086444 A1 | 4/2009 | Yoshikawa et al. | | |
| 2011/0287659 A1 * | 11/2011 | Hensen | ............. | B29C 45/14639 439/488 |
| 2011/0315442 A1 | 12/2011 | Nolting et al. | | |
| 2013/0316596 A1 * | 11/2013 | Hung | ..................... | H01R 4/021 439/694 |
| 2014/0182928 A1 * | 7/2014 | Starke | ..................... | H02G 3/22 174/559 |
| 2015/0162704 A1 * | 6/2015 | Jones | ................... | H01R 13/627 439/345 |
| 2015/0303615 A1 * | 10/2015 | Daugherty, Jr. | ..... | H01R 13/512 385/55 |

FOREIGN PATENT DOCUMENTS

| | | |
|---|---|---|
| DE | 102008022055 A1 | 11/2009 |
| DE | 202009000899 U1 | 6/2010 |
| DE | 202010005085 U1 | 11/2010 |
| DE | 202011002938 U1 | 7/2012 |
| DE | 102011103351 B3 | 9/2012 |
| DE | 102012209571 A1 | 12/2012 |
| DE | 202011109095 U1 | 1/2013 |
| DE | 112012002374 T5 | 2/2014 |
| DE | 102013106255 A1 | 12/2014 |
| DE | 102014101476 A1 | 8/2015 |
| WO | 9927551 | 6/1999 |
| WO | 2012012811 A1 | 1/2012 |

OTHER PUBLICATIONS

German Office Action, Serial No. 10 2015 114 289.9, Applicant: Phoenix Contact GmbH & Co. KG, dated Jun. 24, 2016.
Chinese Office Action with English Translation, Serial No. 201680043374.9, Applicant: Phoenix Contact GmbH & Co. KG, Title: Electric Cable Subassembly, dated Dec. 26, 2018.
English Translation of International Preliminary Report on Patentability, Int. Serial No. PCT/EP2016/069865, Int. Filing Date: Aug. 23, 2016, Applicant: Phoenix Contact GmbH & Co. KG.

\* cited by examiner

ELECTRIC CABLE SUBASSEMBLY

TECHNICAL FIELD

The present disclosure relates to an electrical cable assembly with a connector, in particular a trunk line cable assembly for a photovoltaic system, and to an assembly including a module inverter and the trunk line cable assembly connected thereto, and also relates to a photovoltaic system comprising a plurality of photovoltaic modules and module inverters and AC side cabling between the module inverters and the trunk line cable assemblies.

BACKGROUND

For photovoltaic systems, electrical cables with a cable jacket made of crosslinked plastics are increasingly being used outdoors. These plastics are crosslinked chemically or by radiation, for example. Cables having a cable jacket made of crosslinked plastics are particularly robust and typically provide a longer service life outdoors than conventional cables with PVC jackets, e.g. against exposure to sunlight.

Typical warranty periods of photovoltaic modules are 20 years or more. Therefore, the cable assemblies and associated connectors that are employed should likewise have a correspondingly long service life. Hitherto, cable junctions have often been overmolded, optionally multiple times, and an adhesion promoter is used. Alternatively, a hollow plastic housing is used, which is then potted. Nevertheless, potted or overmolded cables junctions of cables that have a jacket of crosslinked plastics have the drawback that the crosslinked plastic material of the cable jacket typically does not form a good bond with the potting compound or overmolding compound. In other words, the potting compound or overmolding compound does not "stick" sufficiently to the cable jacket. As a result, there is a risk of ingress of water in the case of such junctions, which may have detrimental effects on the system. Similar difficulties may also arise with cable jackets made of plastics which, although not crosslinked, nevertheless do not form an adhesive bond with the potting compound or overmolding compound.

When being overmolded, the cable jacket is typically treated with an adhesion promoter, then the assembly is placed in an injection molding tool and the junction is overmolded. This is usually followed by another or several further overmolding processes. One reason for this is that large mass accumulations of the plastic mass should be avoided, which may lead to sink marks and increase the cycle time of the tool.

When being potted, a housing is typically used which encloses a cable branch junction, for example. Thereafter, the cavity is potted. The potting process takes a long time because the potting compound must cure first. Furthermore, additional components may be needed to help with strain relief and tightness. If strain relief of the cable is provided by the static friction of the potting compound on the wire insulation and the cable jacket, this does not seem to be optimal, not only for the aforementioned reasons.

Typically, high cable pull-out forces are required for photovoltaic cabling. Certain standards require resistance against cable pull-out forces of at least 156 N for inverter connectors, for example.

In Applicant's Sunclix® micon articles, clamps crimped onto the cable provide adequate strain relief. Nevertheless, this concept can be further developed in terms of cost and installation effort.

GENERAL DESCRIPTION

Therefore, an object of the present disclosure is to provide an electrical cable connection which combines a long service life of the employed components with a good tightness and strain relief performance, especially for outdoor use in photovoltaic systems.

A further aspect of the object includes to provide such a cable connection which may help create a high dielectric strength, in particular for the voltages occurring in larger photovoltaic systems, in particular, over the entire service life of the system.

Another aspect of the object includes to provide a cable connection which is suitable for cables having a cable jacket made of a plastic material that does not form an adhesive bond with potting compound or overmolding compound, in particular, a crosslinked plastic material.

The object of the present disclosure is achieved by the subject matter of the independent claims. Various other embodiments of the present disclosure are defined in the dependent claims.

In one embodiment, the electrical cable assembly with an electrical connector comprises at least one electrical cable with a cable jacket which in particular is made of a plastic material that does not form an adhesive bond with potting compound or overmolding compound. This may, in particular, be a crosslinked plastic material. The cable further comprises one or more wires with wire insulations and is stripped in the area of the electrical connector, and the wires are stripped too. In other words, a short section of the cable jacket and of the wire insulation is removed to expose a short length of the wires to be electrically connected at respective wire connection points, i.e. to be mechanically and electrically connected to wires of a further line or with contact elements. The wires can be connected using crimp barrels (e.g. splice crimping), by soldering or welding, for example.

The cable assembly comprises a dielectric connector housing at the cable junction, consisting of at least a first and a second housing part which can be joined together to form a substantially closed dielectric connector housing which encloses the wire connection points.

The connector housing further comprises strain relief means for the cable which dig into the cable jacket when the first and second prefabricated housing parts are firmly joined together so as to provide strain relief for the wire connection points.

The connector may be a cable connector for directly connecting stripped wires to each other, in particular, stripped wires of a cable to stripped wires of further lines, e.g. of another cable. Thus, the stripped wires may be directly interconnected electrically and mechanically, wire-to-wire, for example crimped together. Accordingly, the connector or cable connector is adapted for direct conductor-to-conductor connection by directly connecting the stripped wires to each other, mechanically and electrically, and in particular, it does not relate to a complex connection and junction box which has a plurality of further connection functions and electronic components. In particular, it is possible to directly connect the stripped wire ends of two or more cables to each other, or stripped wire ends of further lines can be directly connected to the stripped wires of the cable. For example, the stripped wire ends of two cables are connected to each other in particular at an angle other than 360°, preferably substantially coaxially under 180°, or the stripped wire ends of further electrical conductors are connected to the stripped wires of the cable in a "T" configuration, e.g. crimped thereto, in order to provide a respective self-supporting cable-to-cable connection or conductor-to-conductor connection which cannot be disconnected non-destructively. Accordingly, the cable connector in particular only has the function of mechanically and electrically connecting the electrical conductors and of insulating the junction. The cable connector may, for example, be designed as a tee connector, in order to connect to a stripped length of a trunk line cable, the stripped wire ends of a branch line, such as a drop line of a photovoltaic generator. In this case, the wires of the trunk line cable, although stripped, may still be continuous, that is to say not severed. In other words, the stripped length of the trunk line cable is an intermediate length between the terminating ends thereof.

The use of separate housing halves in a photovoltaic system, especially outdoors, may initially have appeared problematic. The use of separate prefabricated housing parts or halves made of plastics, however, provides a high level of comfort during assembly. In particular, due to an integrated strain relief, it is possible to keep the assembly costs low while at the same time achieving a high quality and durable connection. Furthermore, a high quality of the electrical connection, in particular with regard to strain relief, can be achieved with simple and inexpensive components. For example, clamps that are crimped to the cable for strain relief purposes can be dispensed with.

In the assembled state, the connector housing preferably has one or more cable openings, that means, in particular, a cable inlet opening and/or a cable outlet opening through which the cable enters into and/or exits from the connector housing. The cable openings are defined by a respective cable receiving sleeve arranged on an end face of the connector housing.

The cable receiving sleeves preferably project outwardly from opposite end faces of the connector housing, in particular, so as to form opposed external cable grommets at the two end faces of the connector housing. The cable receiving sleeves which are therefore preferably provided in the form of sleeve-like extensions or cable grommets on opposite ends of the connector housing, accordingly enclose the cable at the respective cable opening like a sleeve. It is also possible for one of the cable ends to be connected to a control cabinet, for example. In this case, the external cable grommet with a cable thread can be introduced into the control cabinet and then screwed into a terminal, for example.

Preferably, the strain relief means are formed integrally with an inner surface of the connector housing in the region of the cable receiving sleeves, in particular, integrally with the opposed inner surfaces of the first and second housing parts, which may help create reliable and permanent strain relief.

According to a preferred embodiment of the present disclosure, the two cable receiving sleeves are each formed as a separate part from the connector housing and will be engaged in the first and/or second housing parts at the two end faces of the connector housing when the first and second housing parts are firmly joined together. This design of the connector housing consisting of several prefabricated parts is easy to assemble. In other words, the two cable receiving sleeves are inserted into the first and second housing parts at the opposite end faces of the connector housing and, preferably, are held there in a form-fitting manner.

Preferably, the cable receiving sleeves in the form of respective separate parts have radial holes along a circumference thereof, and the strain relief means extend radially inwards, through these holes, in order to dig into the cable jacket. In this way, the installation size can be kept compact.

Suitably, the holes and the strain relief means are configured such that the holes are sealed by the strain relief means. In this way, potting compound may be prevented from spilling out during potting. This may be achieved by a press fit. Large chamfers on the holes facilitate the insertion of the strain relief means. Furthermore, the wall thickness is reduced due to the chamfers, thereby reducing press-fitting forces or insertion forces.

The cable receiving sleeves are split into half-shells axially along the cable, such that a respective first half-shell is integrally formed with the first housing part and a respective second half-shell is integrally formed with the second housing part, so that the at least two partial shells or half-shells are joined to form the annular closed cable receiving sleeve annularly surrounding the cable jacket when the two housing parts or half-shells are joined together.

Preferably, the cable assembly comprises a joining sleeve for each split cable receiving sleeve, which joining sleeve may be fitted onto the cable receiving sleeve consisting of the joined half-shells, thereby pressing together the first and second partial shells or half-shells to form the cable receiving sleeve and also holding together the first and second housing parts in this manner.

Preferably, the joining sleeve is press-fitted, latched, or screwed onto the cable receiving sleeve.

In this way, a firm, reliable and durable mechanical connection of the two housing halves and a sufficient force for effective strain relief can be achieved. A large holding force for pressing together the housing parts can, in particular, be achieved with joining sleeves that are mounted by press-fitting or screwing.

The strain relief means are preferably integrally formed with the concave inner surface of the first and second partial shells or half-shells of the cable receiving sleeves, in particular on both ends, at the cable inlet opening and at the cable outlet opening, and dig into the cable jacket on both sides of the cable junction when the first and second partial shells or half-shells or the entire connector housing is pressed together by means of the joining sleeves. The strain relief means include, for example, pointed strain relief teeth, and/or strain relief ribs inside the first and second half-shells. Preferably, the joining sleeves have a tapering inner contour and the cable receiving sleeves have a tapering outer contour so that a firm mechanical fit is achieved between the housing halves when the joining sleeves are urged and/or pressed onto the latter and to cause the strain relief means to dig into the cable jacket to a sufficient depth. In this manner, a very stable strain relief is achieved, despite the use of a connector housing that is split axially along the cable, and this strain relief may be capable of creating the pull-out forces required for photovoltaic cabling, for example.

Furthermore, gaskets are preferably provided on the cable jacket at both ends of the connector housing, for example, in the form of an elastomeric sealing ring, e.g. made of rubber. The sealing rings or cable gaskets are mounted on the cable jacket on both ends of the connector housing and, in the assembled state, seal the cable jacket against the cable receiving sleeve. Preferably, in the assembled state, the gasket is disposed on an end face of the connector housing inside the cable receiving sleeve or inside the joining sleeve, and, depending on the embodiment, seals against the inner lateral surface or against the end face of the cable receiving sleeve and/or, if present, against the inner lateral surface of the joining sleeve. As a result, high tightness against the ingress of water is achieved, and the seal is durably protected within the joining sleeve. Such a loosely mounted elastomeric cable gasket even seals cables that have jackets made of a plastic material that does not form an adhesive bond with potting compound or extrusion compound, in particular a crosslinked plastic material, and this in the same quality as cables with PVC jackets, for example, since the mechanical frictional sealing effect is substantially independent of the material of the jacket. Preferably, the sealing ring has one or more circumferential sealing lips on its outer circumference, in order to improve the sealing effect without excessively increasing the axially pushing forces that are necessary during assembly.

Preferably, the first or second housing part has longitudinal ribs on its inner surface along the wires of the cable, which define groove-shaped compartments for the individual wires between the longitudinal ribs within the connector housing. As a result, precise assembly can be achieved, and the air and creepage spacing between the stripped wire connection points can be increased.

Furthermore, preferably, the other housing part has transverse ribs on its inner surface, transversely to the wires of the cable, which in the assembled state overlap with the longitudinal ribs in a direction transverse to the cable, so as to individually urge the wires into the respective associated compartments and to retain them therein in the assembled state, e.g. to partly close the compartments at the end of the longitudinal ribs. By means of the transverse ribs, the wires are individually pushed deep into each respectively associated compartment when the housing halves are joined together transversely to the cable axis, and are retained therein in the assembled state. This may also provide a sufficient length of air and creepage spacings between the stripped wire connection points. Furthermore, a longitudinal and/or transverse alignment of the housing parts can be achieved during assembly by virtue of the longitudinal and/or transverse ribs.

The electrical connector is, in particular, formed as a tee connector for making an electrical branch from a cable that extends through the connector. This is particularly suitable for so-called trunk lines of alternating current cabling of photovoltaic modules with module inverters. In cases of such an AC cabling, an individual inverter is typically provided for each photovoltaic module or for groups of photovoltaic modules, and the inverter is directly mounted to the photovoltaic module or mounted in the vicinity of the photovoltaic module or grouped photovoltaic modules. Therefore, module inverters are also referred to as micro-inverters. In this embodiment of the present disclosure, the connector housing in the assembled state preferably has a first and a second opposite cable opening where the same cable enters the connector housing on one side of the wire connection points and exits the connector housing on the other side of the wire connection points. In order to connect a branch line for connection to the respective module inverter (so-called drop line), the connector housing has a further lateral inlet opening (aligned transversely to the cable), through which wires of the drop line enter the connector housing to be electrically connected to the respectively associated wire of the cable in the form of a tee branch within the connector housing. For example, the wires of the drop branch or drop line are crimped, by means of a crimp barrel, onto the cable wires which are stripped along an intermediate portion of the cable and, in particular, are not severed, and then the wires of the drop line are angled, which can be made easily and efficiently. In this case, the cable can be partially stripped in an intermediate portion thereof, and the wires can be partially stripped, in particular, without severing the wires there. This is desirable, because an additional contact point is avoided so that no increase in contact resistance will be caused. However, it is also possible to sever the cable at the tee branch. In this case, two trunk line cables will be provided, which can be directly welded or crimped together, for example.

The half of the housing through which the wires of the drop line enter the connector housing has a connection sleeve projecting from this housing half, transversely to the cable, which defines the inlet opening for the wires of the drop line, so that the connector housing as a whole has a T-shape. The inlet opening in the interior of the connection sleeve is preferably defined by individual holes or bores for the wires of the drop line, so that the wires of the drop line are more or less individually sealed in the connection sleeve. In this way, it maybe prevented that upon overmolding with a plastic material, the overmolding plastic material escapes through the connection sleeve.

Once the respective wires have been electrically contacted, the housing halves have been joined together, and the joining sleeves have possibly been press-fitted or the like, the connector housing can be substantially completely overmolded with a plastic material, in particular together with the joining sleeve, so that the overmolded material preferably covers the joining sleeve and extends as far as to the cable jacket. In this way, protection of the joining sleeves and further improvement of tightness can be achieved. However, the connection according to the present disclosure does not rely solely on the sealing by the overmolding, in particular, due to the inner sealing rings on the cable jacket. Due to the high pressure during overmolding of the connector housing, a large force for pressing together the housing parts is also generated.

Preferably, the connector housing has openings, e.g. one of the housing parts, through which the plastic material can penetrate into the interior of the connector housing, possibly as far as to the wires, and can at least partially fill the interior of the connector housing, in particular around the wire connections points during overmolding. Therefore, the cable connection does not necessarily require a separate potting compound as hitherto often used for trunk line connections. Nevertheless, the overmolded plastic material, when penetrating into the interior of the connector housing, provides for a further improvement of mechanical stability and durability. In addition, the creepage spacings can be further increased. However, the connector housing may as well have a dedicated injection port, e.g. in the form of a further hole in the connection sleeve, through which a potting compound is injected into the interior of the connector housing.

Generally, the overmolding can help to pass a standard cold-crack test for such connections with an impact energy of, for example, 7 joules at a temperature of −35° C.

The connector housing does not necessarily need to be made of a crosslinked plastic material, but may rather inexpensively be made of a thermoplastic such as PPE, which is processed easily and cost-effectively, like the overmolding material. This may also help create a particularly good bonding between the connector housing and the overmolded material on the previously joined housing halves and further components. Preferably, both the connector housing and the overmolding material consists of a thermoplastic material, in particular, of the same plastic material.

The subject matter of the disclosure also includes the trunk line cable assembly for connecting a module inverter placed near a photovoltaic module, comprising:
  an electrical cable with a cable jacket in particular made of a plastic material which does not form an adhesive bond with potting compound or overmolding compound, such as a crosslinked plastic material, and one or more wires, wherein the cable is stripped in the region of the electrical connector and the wires are stripped to expose and electrically connect the wires at respective wire connection points, at least a first and a second housing part, which in the assembled state are firmly joined together and in the so joined state define a dielectric connector housing enclosing the wire connection points in the assembled state, and wherein the connector housing has a cable inlet opening and a cable outlet opening opposite to the cable inlet opening, through which the cable enters the connector housing on a first end and exits on an opposite, second end, wherein the connector housing has a further inlet opening through which, in the assembled state, wires of a drop line enter the connector housing and are electrically connected inside the connector housing with the respectively associated wires of the cable in the form of a tee branch, e.g. crimped using a crimp barrel, wherein the wires of the drop line are connectable to a module inverter, directly or by means of a further connector, wherein strain relief means for the cable are provided on both sides of the connector housing, i.e. at the cable inlet opening and at the cable outlet opening, which dig into the cable jacket and thus are effective when the first and second housing parts are firmly joined together, and wherein further electrical connectors are mounted at the two ends of the cable facing away from the connector housing, for interconnecting a plurality of the trunk line cable assemblies into a string so as to connect the photovoltaic modules to form a string on the AC side.

Another subject matter of the disclosure includes an assembly consisting of a module inverter and the trunk line cable assembly connected thereto through the wires of the drop line, wherein the trunk line cable assembly is, in particular, directly connected to the module inverter, wherein the first or second housing part has a connection sleeve projecting from the respective housing part transversely to the cable, which defines an inlet opening for the wires of the drop line and, in the assembled state, extends through an opening into the housing of the module inverter to lead the wires of the drop line into the module inverter for being connected there to the AC output of the module inverter. The connection sleeve may, for instance, have a thread which can be screwed inside the module inverter.

A further subject matter of the disclosure includes a photovoltaic system comprising a plurality of photovoltaic modules that have a respective module inverter associated therewith, individually or in groups, a so-called microinverter, wherein a respective one of the trunk line cable assemblies as described above is connected to each module inverter, and wherein the trunk line cable assemblies are interconnected into an AC side string to provide AC cabling for the photovoltaic modules.

A further subject matter of the disclosure includes a method for producing an electrical cable assembly with a connector, comprising the steps of:

providing an electrical cable with a cable jacket, in particular, made of a plastic material which does not form an adhesive bond with potting compound or overmolding compound, such as a crosslinked plastic material, and with one or more wires with wire insulations, providing first and second mateable housing parts with strain relief means for the cable, stripping a portion of the cable jacket, partially removing the wire insulations in the area of the stripped jacket in order to expose the wires, electrically connecting further wires, in the form of a tee branch, or contact elements to the exposed wires to produce wire connection points, inserting the portion of the cable including the wire connection points into the first or second housing part, placing the other housing part thereon and joining together the first and second housing parts so as to form a substantially closed dielectric connector housing enclosing the wire connection points, wherein the strain relief means dig into the cable jacket when the first and second housing parts are firmly joined together.

The gaskets are placed on the cable jacket on both sides of the connector housing and are slidingly urged towards the junction. The joining sleeves or cable receiving sleeves are slidingly fitted on the gaskets, so that, in the assembled state, the gaskets seal against the cable jacket on the inner side and against the cable grommet on the outer side.

The present disclosure will now be explained in more detail by way of embodiments and with reference to the figures, wherein the same and similar elements are partially designated by the same reference numerals and wherein the features of the different embodiments can be combined with one another.

DETAILED DESCRIPTION

Figure 1:
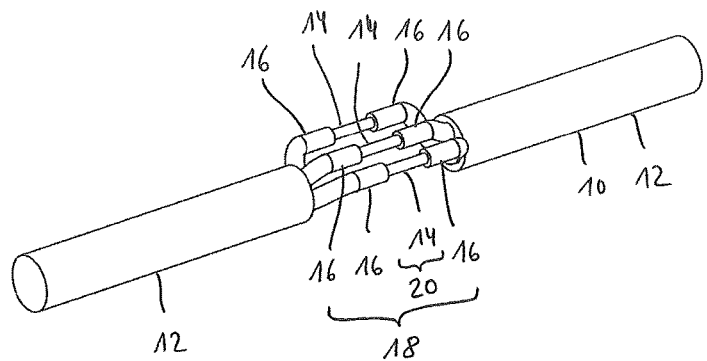
FIG. 1 is a perspective view of a portion of a partially stripped cable with three partially stripped wires.

Referring to FIG. 1, a cable 10 having a cable jacket 12 and three wires 14, each one with wire insulation 16, is first partially stripped in an intermediate portion 18, that is to say, not at the ends of the cable. That means that, in the intermediate portion 18 of the cable 10, the cable jacket 12 is cut on both sides of the intermediate portion 18 and is removed in the intermediate portion 18, so that the cable 10 will therefore only be stripped in the intermediate portion 18. Then, the wires 14 are partially stripped in this partially stripped portion 18, i.e. an intermediate portion 20 is produced within the intermediate partially stripped portion 18 of the cable 10, by removing the wire insulation 16 from wires 14. In other words, the wire insulation 16 and the cable jacket 12 of cable 10 are retained on both sides of the stripped wires 14. Wires 14 are not severed here. In the present example, the three wires 14 are furthermore spatially separated from each other and arranged in a plane next to each other, and the three wires 14 are slightly bent upwards on both sides of the intermediate portion so as to be axially displaced in order to already appropriately prepare the subsequent insertion into the lower housing half.

The cable jacket 12 is made of crosslinked plastic material which exhibits high resistance to weathering, in particular to UV radiation and moisture.

Figure 2:
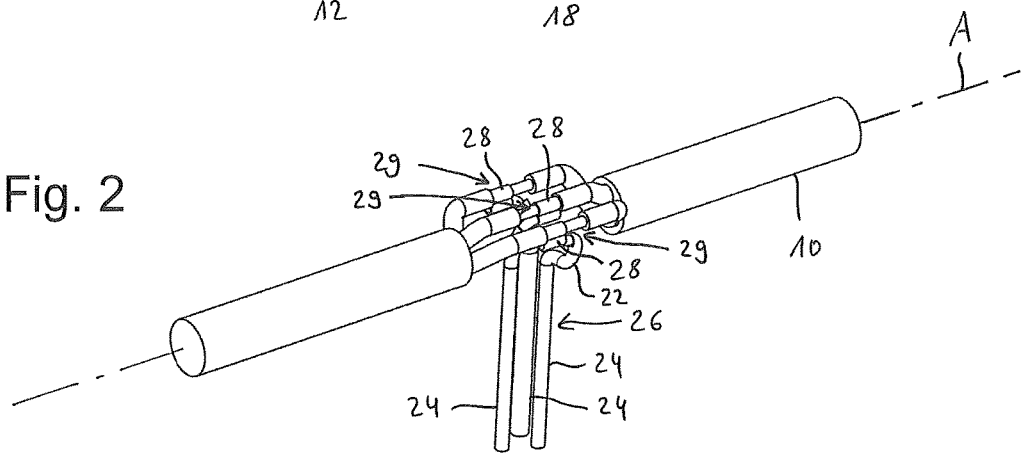
FIG. 2 shows the cable portion of FIG. 1, with wires of a drop line crimped thereto.

Referring to FIG. 2, a respective stripped end 22 of a wire 24 of a drop line 26 is crimped to each wire 14 in the stripped portion 20, using a respective crimp barrel 28, in order to produce wire connection points 29 of a tee branch on the cable 10.

Figure 3:
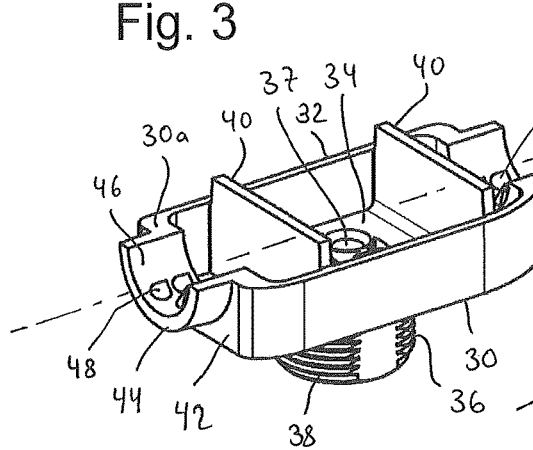
FIG. 3 is a perspective view of a lower housing half according to a first embodiment of the present disclosure.
Figure 4:
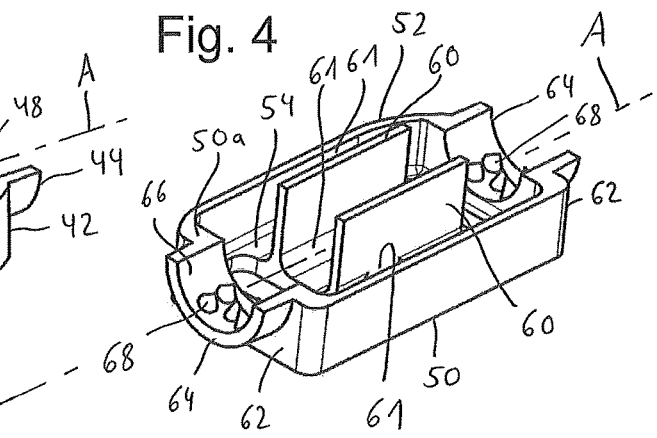
FIG. 4 is a perspective view of an upper housing half according to the first embodiment of the present disclosure.

Referring to FIG. 3, the lower housing half 30 comprises a trough-shaped body 32 with a bottom 34 from which a connection sleeve 36 extends outwardly. Connection sleeve 36 has fastening means, in the present example, in the form of an external thread 38, in order to be introduced into and screwed in an opening of a module inverter. Alternatively, the connection sleeve 36 may as well be fixed with a wedge, latched, or otherwise fastened. Inside the lower housing half 30, two transverse ribs 40 extend upwards from the bottom 34 thereof, i.e. towards the upper housing half 50. Housing extensions in the form of half-shells 44 extend axially along the axis A from the two end faces 42 of the lower housing half 30. In this example, strain relief teeth 48 are integrally formed with the inner surface of lower housing half 30, in the present example on the concave inner surfaces 46 of the half shells 44. However, it is likewise possible that, for instance, strain relief ribs are formed integrally with the concave inner surfaces of the half-shells. The upper housing half 50, which is complementary to the lower housing half 30, also comprises a trough-shaped body 52. Two longitudinal ribs 60 extend from the cover plate 54 thereof, the ribs divide the interior of the housing into three axial compartments 61 in which the three wires 14 of the cable 10 will extend axially in the assembled state. The wire connection points 29 between the wires 14 of cable 10 and the wires 24 of drop line 26 are separated from each other by the longitudinal ribs 60 in order to increase the air and creepage spacings. Half-shells 64 extend axially from the two end faces 62 of the upper housing half 50, axially projecting from the end faces 62. Strain relief teeth 68 are integrally formed with the inner surface of the upper housing half 50, in the present example, on the concave inner surfaces 66 of half-shells 64. The two housing halves 30, 50 can be mated with each other, and as the transverse ribs 40 and the longitudinal ribs 60 protrude beyond the respective peripheral edge 30a, 50a of the lower and upper housing halves 30, 50, the longitudinal ribs 60 will engage between the transverse ribs 40 when the two housing halves 30, 50 are joined together so that the transverse ribs 40 and the longitudinal ribs 60 will overlap transversely to the axis A.

Figure 5:
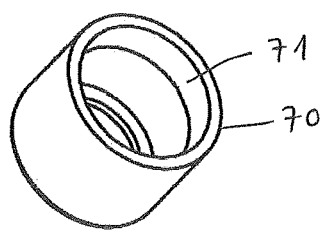
FIG. 5 is a perspective view of a joining sleeve to be press-fitted, according to the first embodiment of the present disclosure.

FIG. 5 shows a joining sleeve 70 which, in the assembled state of the two housing halves 30, 50, is press-fitted onto the cable receiving sleeves 72 which are formed by the respective half-shells 44, 46 on both ends of the connector housing.

Figure 6:
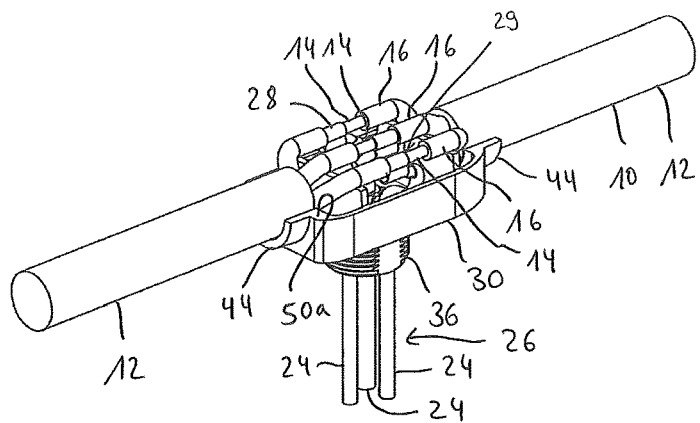
FIG. 6 shows the cable portion of FIG. 2, inserted in the lower housing half of FIG. 3.
Figure 7:
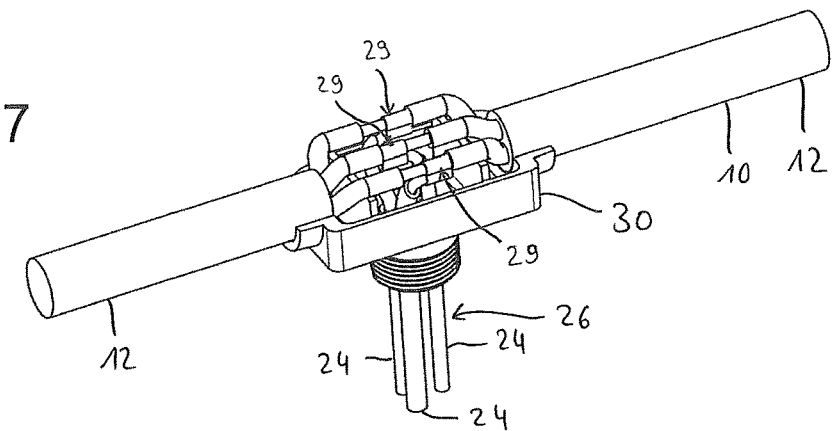
FIG. 7 is similar to FIG. 6, but rotated about 180 degrees.

Referring to FIG. 6, the cable 10, crimped to the drop line 26, is inserted into the lower housing half 30 while leading out the wires 24 of the drop line 26 through individual holes 37 in the connection sleeve 36 (see also FIGS. 14&15 and 21&22). Transverse ribs 14 may provide that the wires 14 are held axially offset slightly above the edge 50a, and the jacket 12 of cable 10 is disposed in the two half-shells 44 at the end faces.

Figure 8:
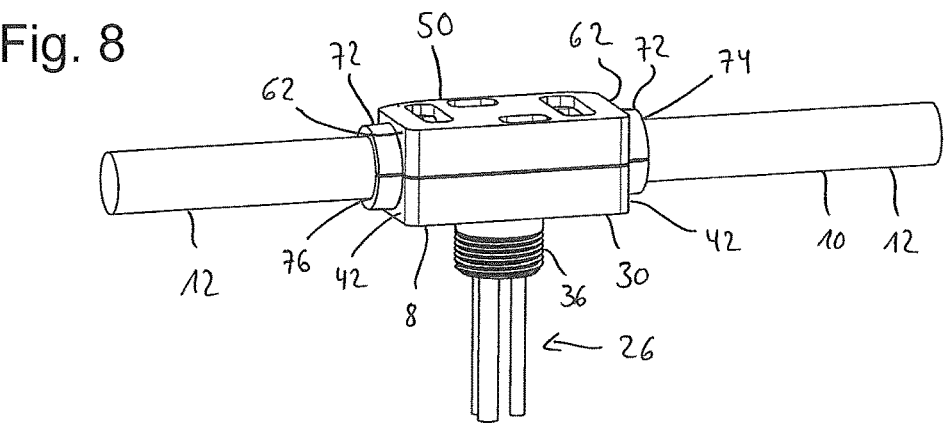
FIG. 8 is similar to FIG. 7, with the upper housing half attached.

Referring to FIG. 8, the upper housing half 50 is placed on the lower housing half 30 to form a substantially closed plastic connector housing 8 into which the cable 10 enters through a cable inlet opening 74 and the same cable 10 exits through a coaxial cable outlet opening 76, wherein the cable inlet opening 74 and the cable outlet opening 76 are each formed by the coaxial opposite cable receiving sleeves 72 on the end faces. Drop line 26 enters the interior of connector housing 8 through holes 37 in the connection sleeve 36.

Figure 9:
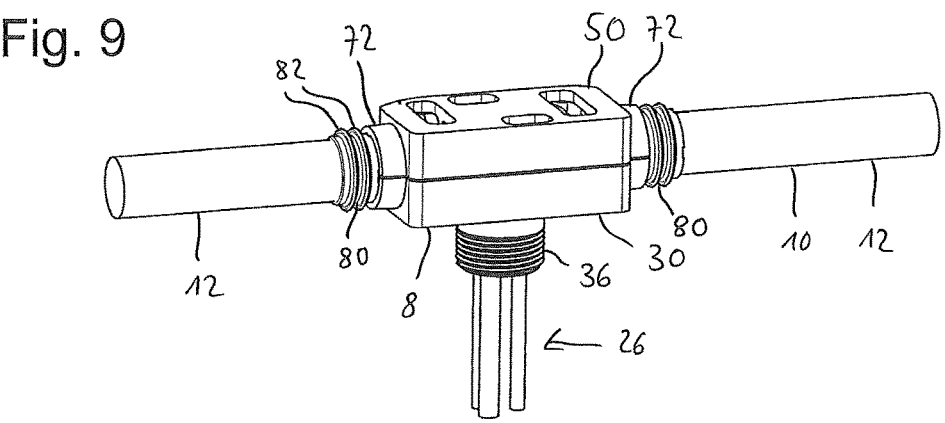
FIG. 9 is similar to FIG. 8, with cable gaskets fitted thereon.

Referring to FIG. 9, two gaskets 80 are slidingly mounted on the cable receiving sleeves 72 at the end faces, and in the illustrated example the gaskets 80 are of annular design having a flat cross-sectional shape and a plurality of annular sealing lips 82 extending outwardly.

Figure 10:
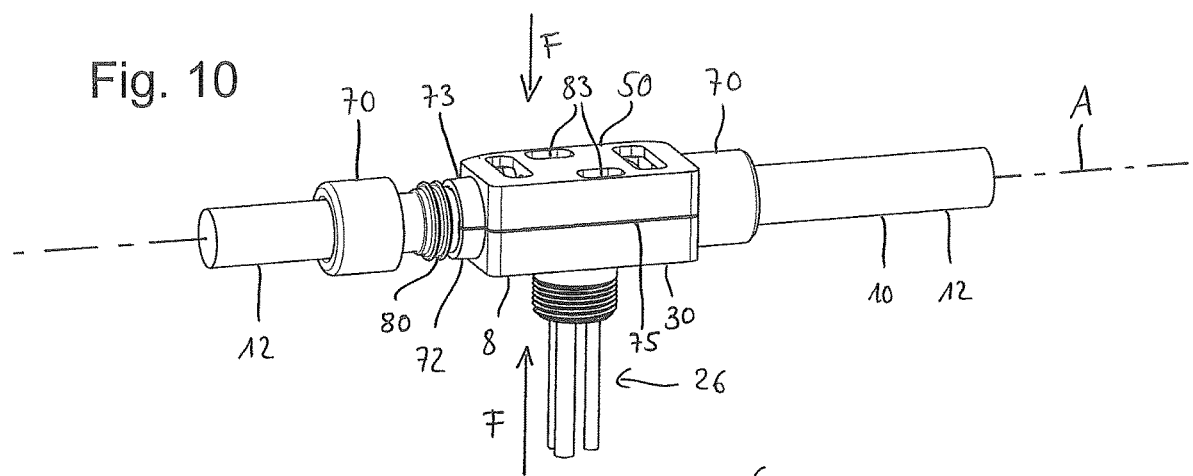
FIG. 10 is similar to FIG. 9, with joining sleeves.

Referring to FIG. 10, the joining sleeves 70 are each slidingly fitted over the sealing rings 80 and the cable receiving sleeves 72, and in the embodiment of FIGS. 1-13 they are press-fitted to the cable receiving sleeves 72. For this purpose, the annular outer surface 73 of cable receiving sleeve 72 and the annular inner surface 71 of joining sleeve 70 both have a tapering contour so as to fit each other, so that when being press-fitted a sufficient pressing force F is generated between the two housing halves 30, 50, transversely to the axial separation line 75. Upon press-fitting, or due to the radially effective pressing force F, the strain relief teeth 48, 68 dig into the cable jacket 12, so that an effective and permanent strain relief is achievable. Moreover, the joining sleeve 70 presses the gasket 80 onto the cable 10 may prevent water from flowing along the cable 10.

Figure 11:
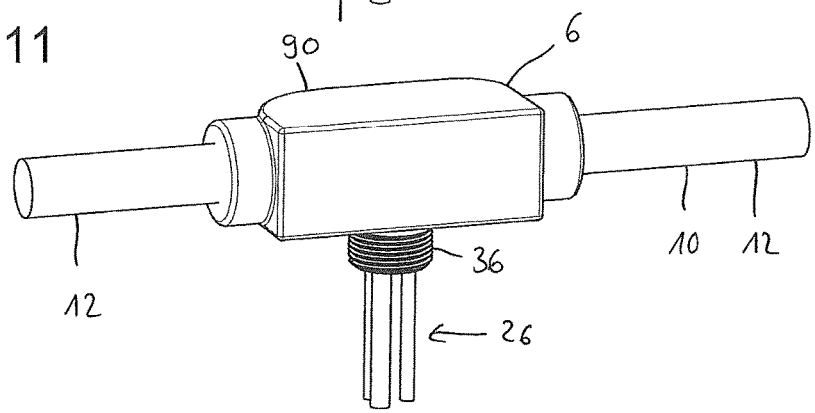
FIG. 11 is similar to FIG. 10, after press-fitting of the joining sleeves and overmolding.
Figure 12:
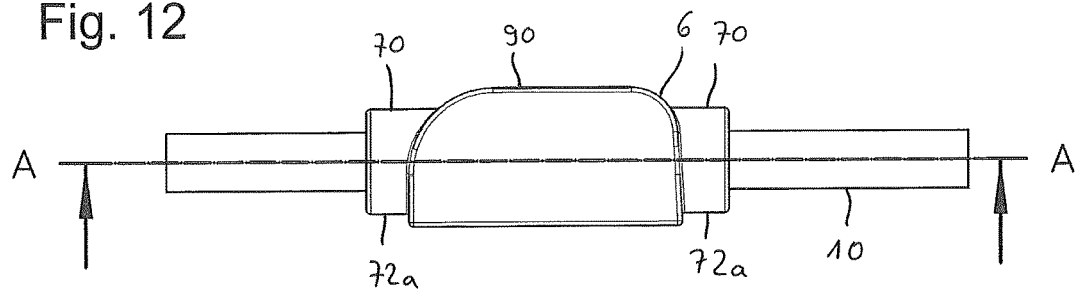
FIG. 12 shows the same as FIG. 11, but in a top plan view.

Referring to FIG. 11, the entire connected assembly including the assembled connector housing 8 with the joining sleeves 70 is overmolded with a plastic overmold 90.

The overmold 90 encloses the connector housing 8 as far as to the connection sleeve 36, with the thread 38 thereof remaining free, and extends over the joining sleeves 70 as far as to the cable jacket 12. The overmold 90 furthermore forms the desired outer contour of the connector 6. The overmolding compound bonds well to the connector housing 8, thereby preventing creepage paths on the connector housing 8.

Figure 13:
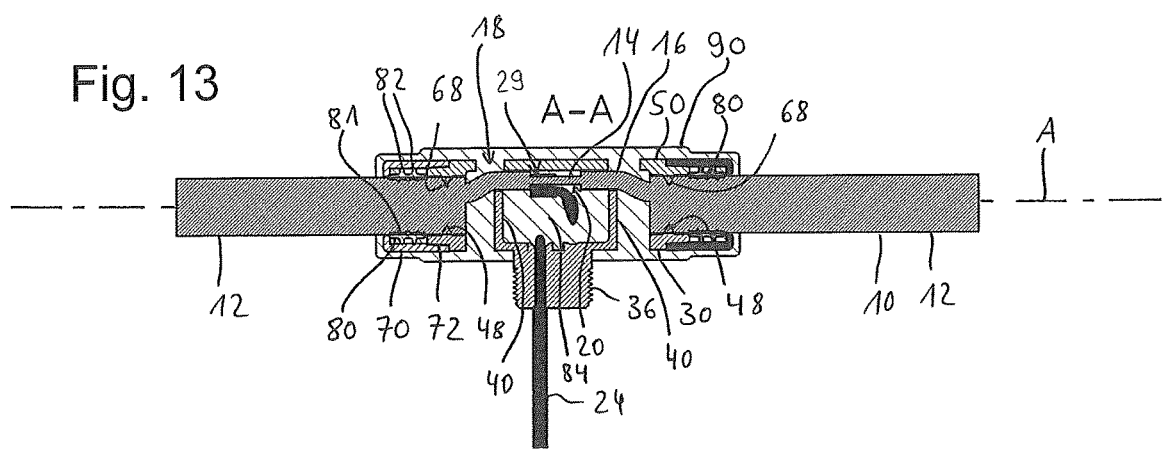
FIG. 13 is a cross-sectional view taken along line A-A of FIG. 12.
Figure 14:
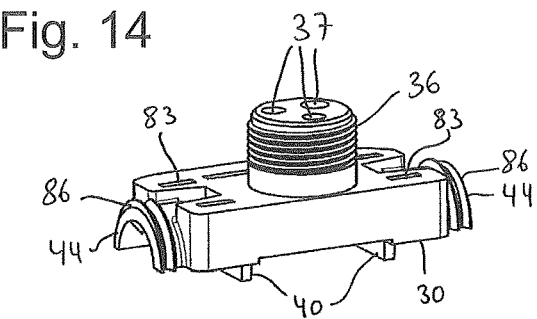
FIGS. 14-17 are perspective views of an upper and a lower housing half according to a second embodiment of the present disclosure.
Figure 15:
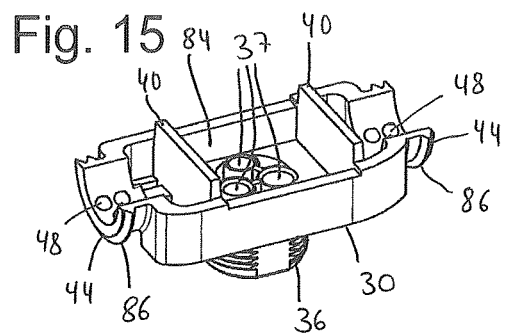
Figure 16:
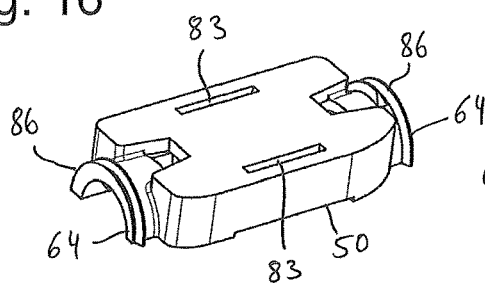
Figure 17:
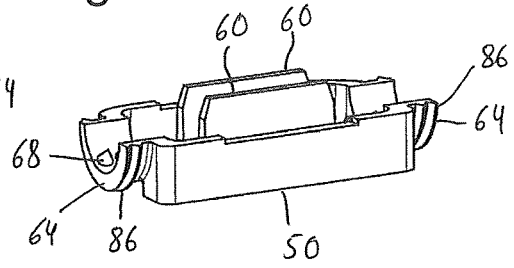
Figure 18:
FIG. 18 is a perspective view of a joining sleeve that can be screwed, according to the second embodiment of the present disclosure.
Figure 19:
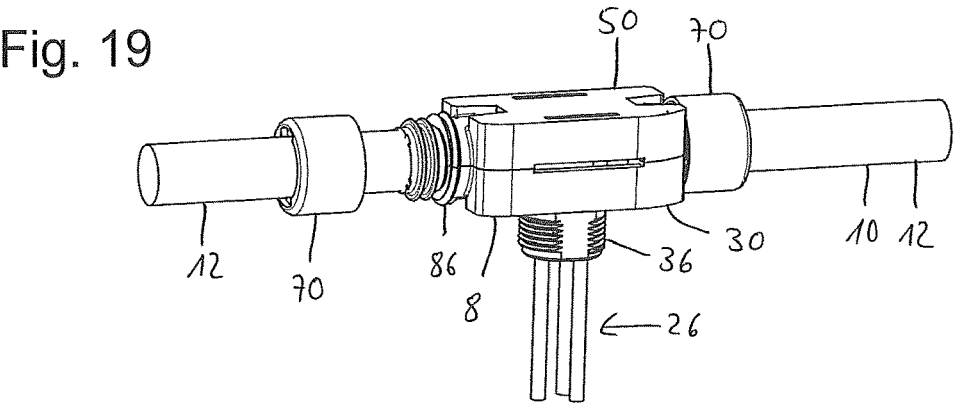
FIG. 19 is a perspective view of the cable assembly with one screwed joining sleeve and one joining sleeve not yet screwed.
Figure 20:
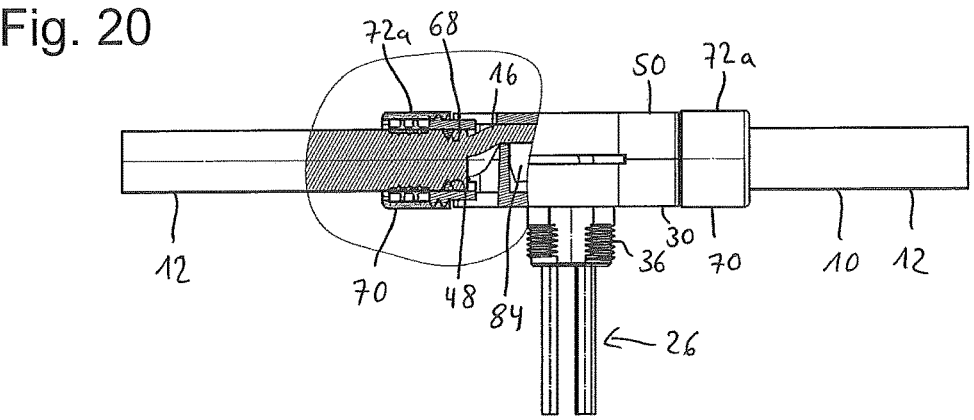
FIG. 20 is a partially cutaway side view of the cable assembly of FIG. 19, with the two joining sleeves screwed.
Figure 21:
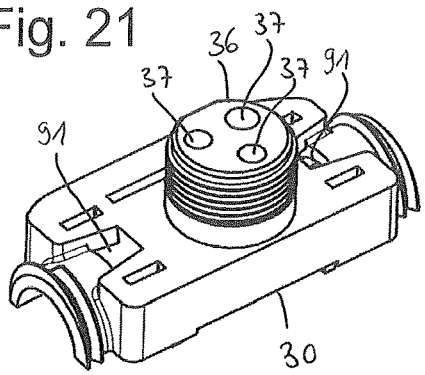
FIGS. 21-24 are different views of the upper and lower housing halves of a third embodiment of the present disclosure.
Figure 22:
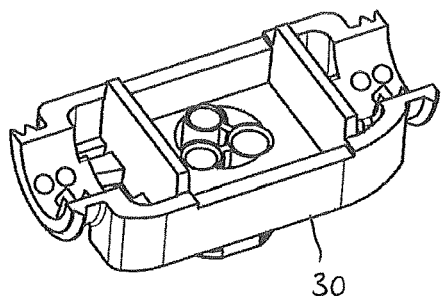
Figure 23:
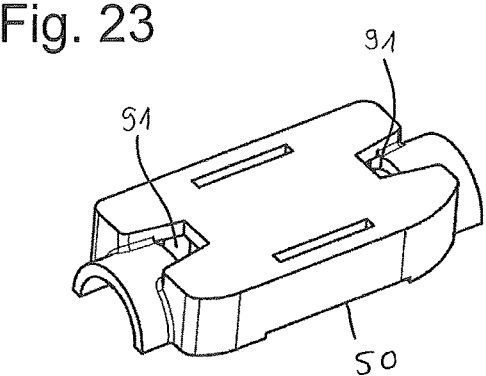
Figure 24:
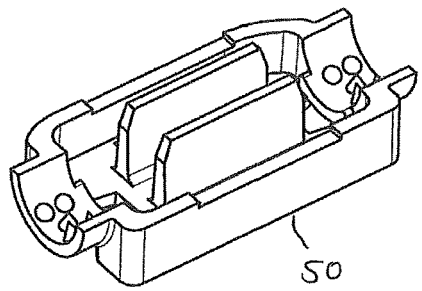
Figure 25:
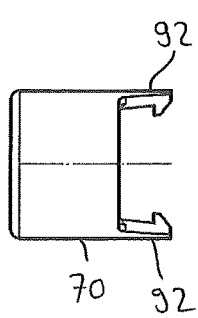
FIGS. 25 and 26 are different views of a joining sleeve that can be latched, according to the third embodiment of the present disclosure.
Figure 26:
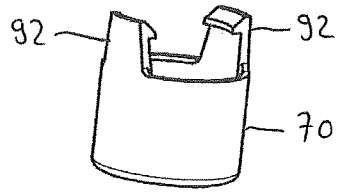
Figure 27:
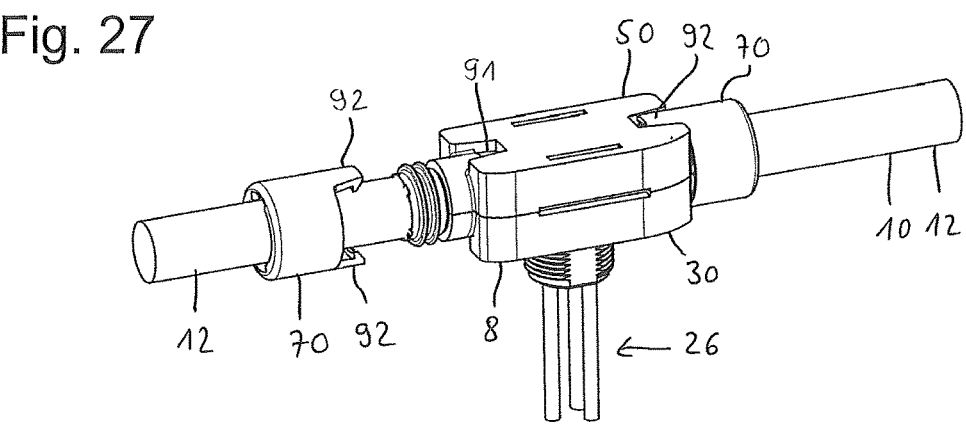
FIG. 27 is a perspective view of the cable assembly with one latched joining sleeve and one joining sleeve not yet latched, according to the third embodiment of the present disclosure.
Figure 28:
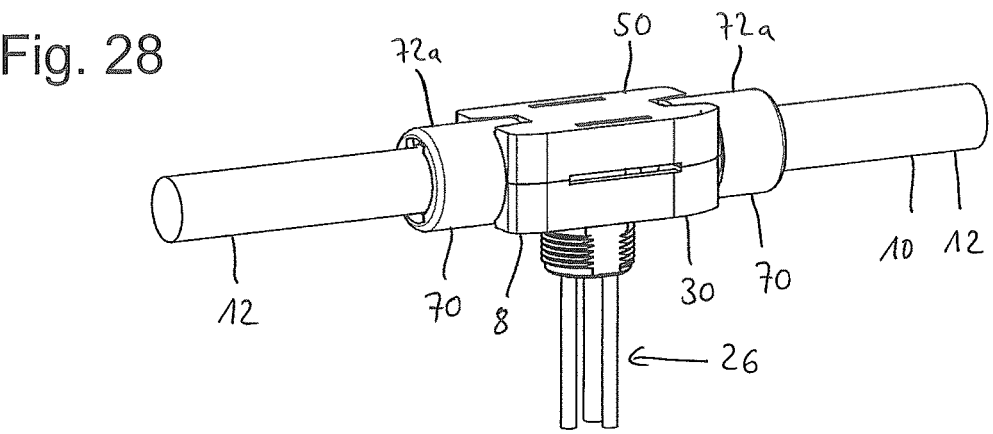
FIG. 28 is similar to FIG. 27, with both joining sleeves in the latched state.
Figure 29:
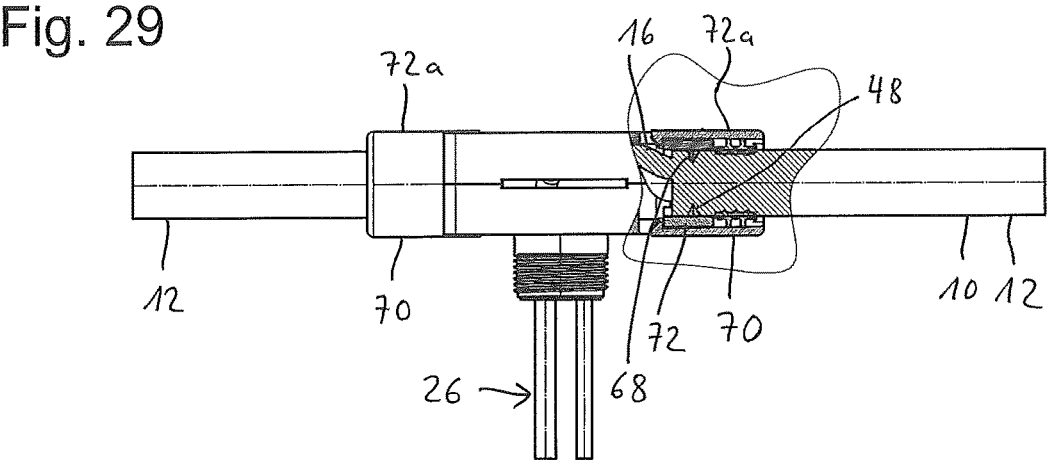
FIG. 29 is a partially cutaway side view of the cable assembly of FIG. 28.

Referring to FIG. 13, the plastic overmolding material 90 can penetrate into the interior 84 of the connector housing 8, through openings 83, and can optionally fill the interior 84. Thus, the overmold 90 will be integrally formed with the filling of the housing interior 84, and in the present example, it consists of a thermoplastic injectable plastic material, e.g. a polyphenylene ether (PPE), or a blend containing PPE.

Cable receiving sleeves 72 completely enclose the cable jacket 12 at both ends of the connector housing 8 in annular manner, and the strain relief means, in the present example in the form of sharp strain relief teeth 48, 68, dig deep into the cable jacket 12 on both sides of the wire connection points 29, so that good strain relief of the wire connection points 29 is made possible. Sealing ring 80 is compressed between the joining sleeve 70 and the cable receiving sleeve 72, and annularly seals against the cable jacket 12 at its ring inner surface 81, and against the annular inner surface 71 of the joining sleeve 70 at its ring outer surface with the sealing lips 82. In particular, the combination of the firmly joined housing halves 30, 50 including the joined half-shells 44, 64, the separate elastomeric sealing ring 80, and the joining sleeve 70 in the form of a cap-like sleeve, and the overmold 90 therearound provide for excellent sealing performance and thus resistance to weathering and durability of the entire assembly.

With reference to FIGS. 14 to 20, a second embodiment of the connector housing 8 or the two housing halves 30, 50 and the joining sleeve or cap-like sleeve 70 is illustrated. The two half-shells 44, 64 joined to form the cable receiving sleeve 72 have a thread 86 on their radially outer circumferential surface, onto which an internal thread 88 of the joining sleeve 70 is screwed. This screw connection provides for sufficient pressing action for the two housing halves 30, 50, in particular, if a tapering design is used here as well. Otherwise, the configuration and assembly corresponds to that of the first embodiment illustrated in FIGS. 1 to 13.

Referring to FIGS. 21 to 29, a third embodiment of the connector housing 8 has respective locking grooves 91 on the two housing halves 30, 50, on both axial sides of the connection points 29, into which latching arms 92 engage when the joining sleeves 70 are mounted. In this embodiment, the dual function of the overmold 90, namely on the one hand the sealing function against moisture and, on the other hand, the function of generating a pressing force for joining the two housing halves 30, 50 or the respective half-shells 44, 64, is particularly desirable in order to have a sufficient pressing force exerted on the strain relief means 48, 68 so that they sufficiently dig into the cable jacket 12 during assembly. Otherwise, the configuration and assembly corresponds to that of the first and second embodiments of the present disclosure according to FIGS. 1 through 13 and FIGS. 14 through 20, respectively.

Figure 30:
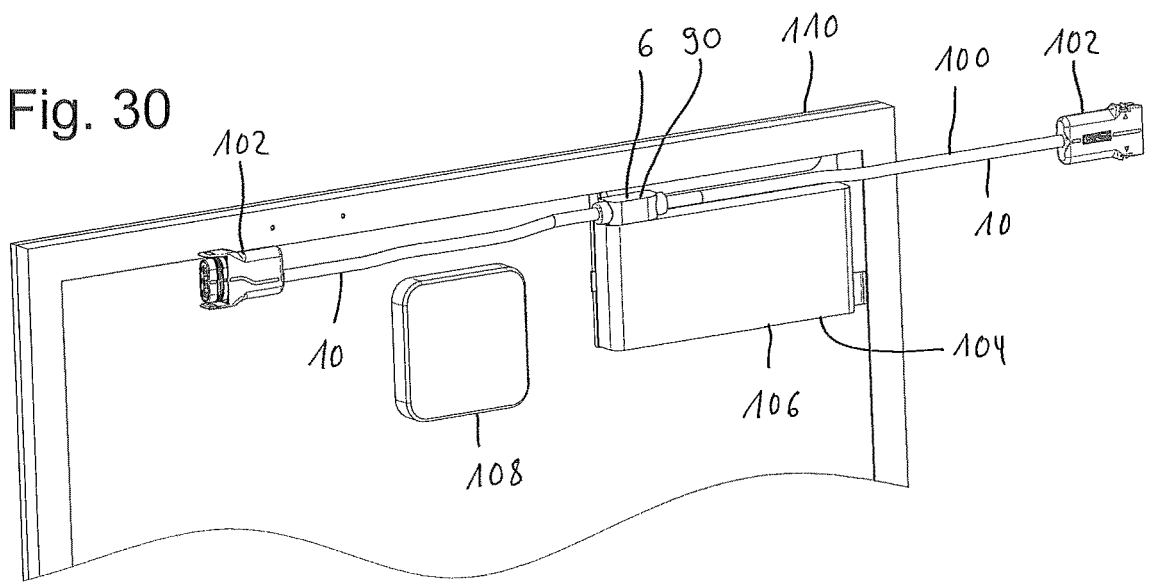
FIG. 30 is a perspective partial view of a photovoltaic module with solar junction box, module inverter, and a trunk line cable assembly.
Figure 31:
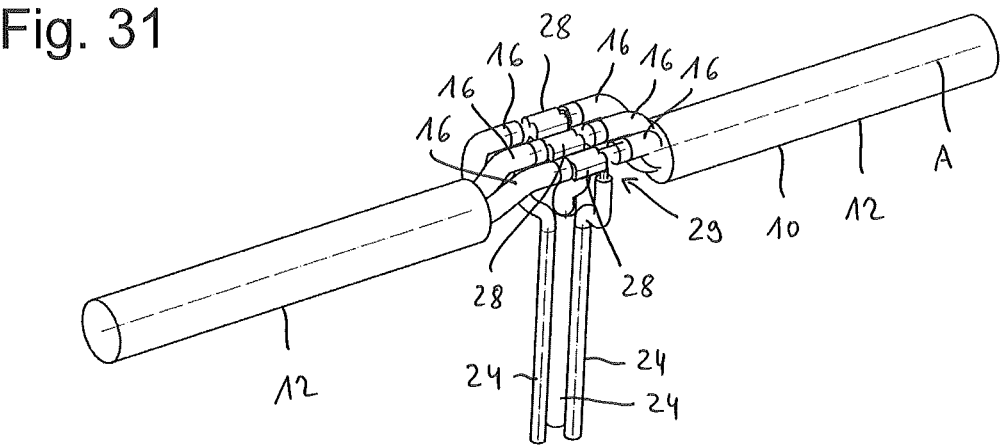
FIG. 31 is similar to FIG. 2.
Figure 32:
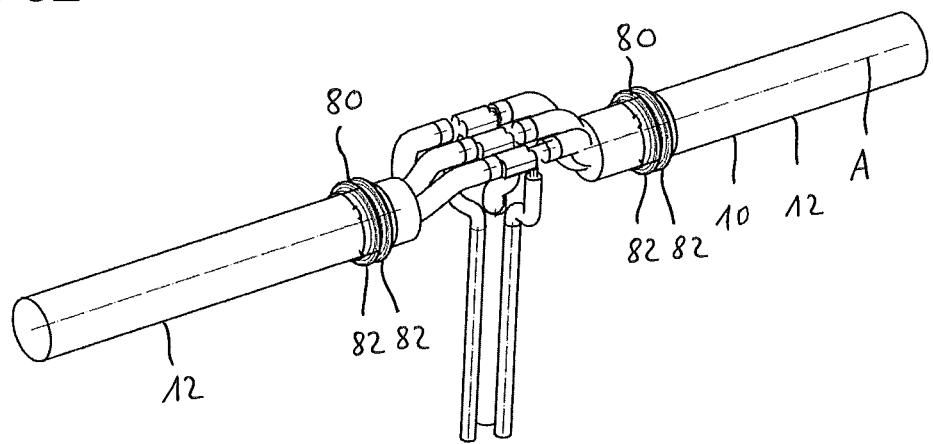
FIG. 32 is similar to FIG. 31, with fitted gaskets.
Figure 33:
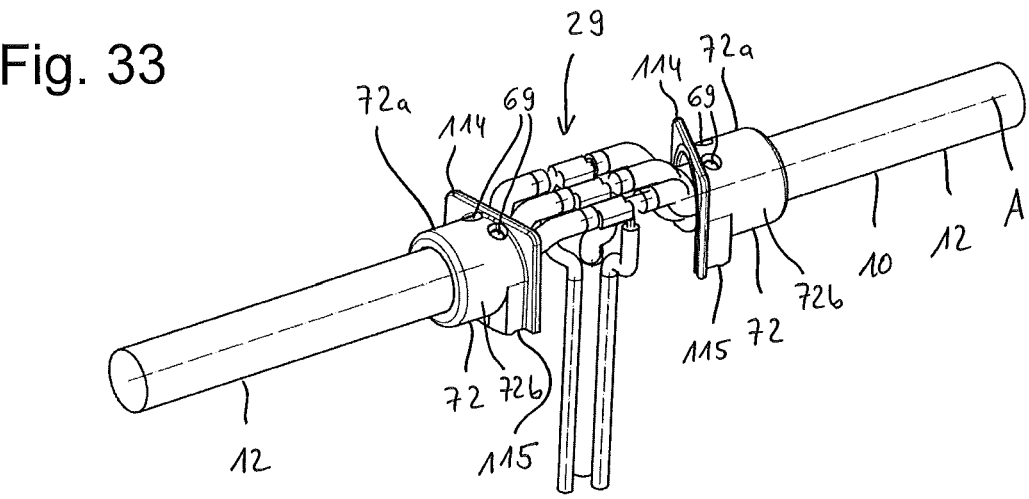
FIG. 33 is similar to FIG. 32, with mounted cable receiving sleeves according to a fourth embodiment of the present disclosure.
Figure 34:
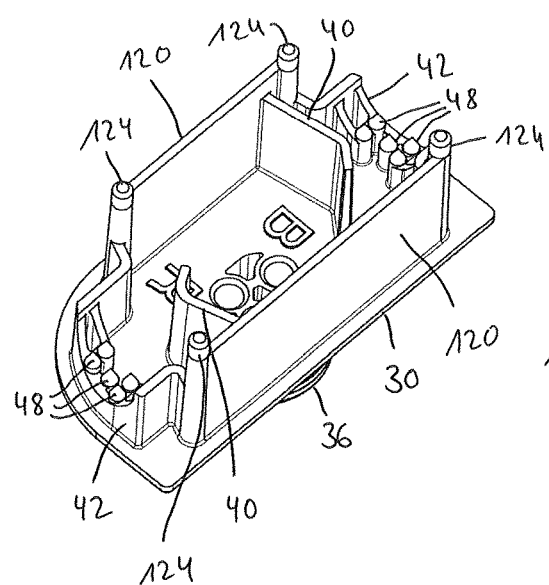
FIG. 34 is a perspective view of the lower housing half according to the fourth embodiment of the present disclosure.
Figure 35:
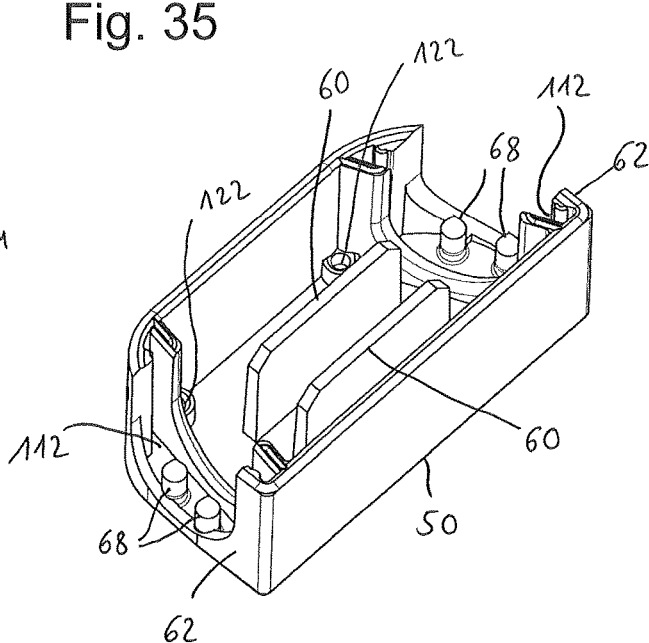
FIG. 35 is a perspective view of the upper housing half according to the fourth embodiment of the present disclosure.
Figure 36:
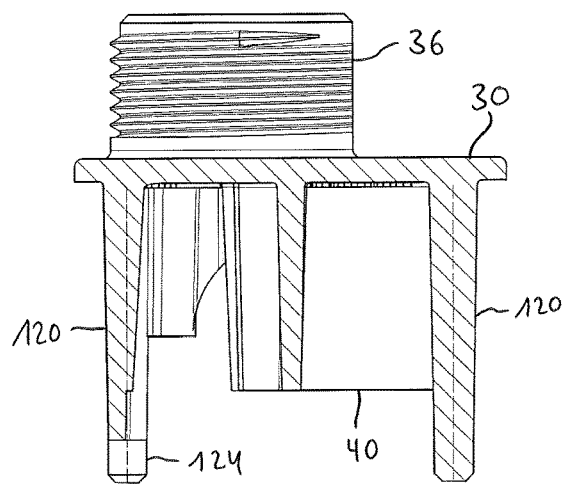
FIG. 36 is a cross-sectional view through the lower housing half of FIG. 34.
Figure 37:
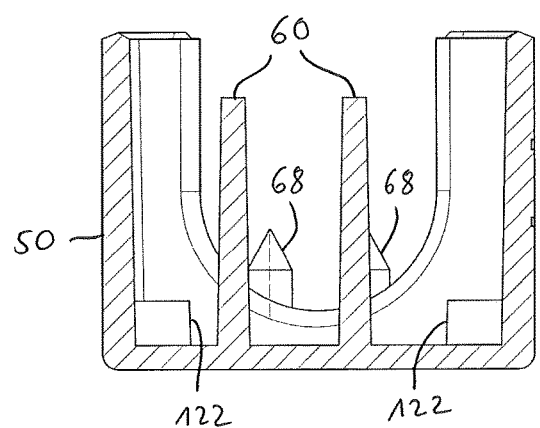
FIG. 37 is a cross-sectional view through the upper housing half of FIG. 35.
Figure 38:
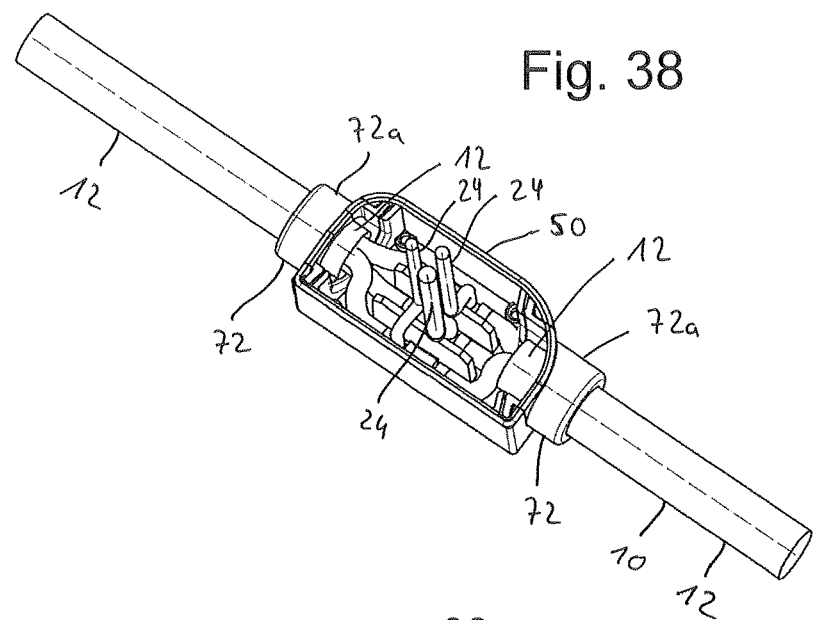
FIG. 38 is a perspective view of the assembly of FIG. 33 combined with the upper housing half of FIG. 35.

Referring to FIG. 30, the completely assembled trunk line cable assembly 100 including plug-in end connectors 102 and the T-shaped cable connector 6 is connected to an inverter 104. For this purpose, the connection sleeve 36 of the cable connector 6 is introduced into an opening of the inverter housing 106 and is screwed inside the inverter housing 106 (not illustrated). A solar junction box 108, which is known per se, contacts the conductor strips of the photovoltaic module 110, and is connected to the inverter 104 via connection cables, not shown. In this manner, a photovoltaic system with AC cabling can be configured, with a respective modular inverter 104 on each solar module 110 or on groups of solar modules 110. The cable 10 may, therefore, be referred to as a trunk cable or trunk line cable.

Referring to FIGS. 31 to 40, a fourth embodiment of the present disclosure is illustrated. In this case, once the gaskets 80 have been slidingly fitted on the cable jacket 12 from the two ends, a respective cable receiving sleeve 72 is slidingly mounted on both sides of the wire connection points 29, which encloses and accommodates the associated gasket 80 in the assembled state.

In this embodiment, the two cable receiving sleeves 72 are formed as separate parts from the connector housing 8, which are combined with the two housing halves 30, 50. Gasket 80 with its peripheral outer sealing lips 82 seals against the inner circumference of the cable receiving sleeve 72 which defines a cable grommet 72a.

Referring to FIGS. 34 to 37, the upper housing half 50 has a respective seat 112 at its two end faces 62, each seat extending transversely to the cable 10. The two seats 112 for the two cable receiving sleeves 72 each comprise a sliding guide, extending transversely to the cable, for a collar 114 of the associated cable receiving sleeve 72. Accordingly, once the two cable receiving sleeves 72 have been appropriately positioned axially on the cable jacket 12, the upper housing half 50 and the partially assembled cable assembly with the two cable receiving sleeves 72 are slidingly fitted to each other, transversely to the cable, whereby the collars 114 are introduced into the seats 112. Due to the radial sliding guide, an axial form-fit is provided between the cable receiving sleeve 72 and the upper housing half 50 in the assembled state.

Furthermore, the two cable receiving sleeves 72 each have radial holes 69 extending through the annular lateral wall 72b of the respective cable receiving sleeve 72. When the upper housing half 50 and the two cable receiving sleeves 72 are slidingly fitted to each other, the strain relief teeth 68 will engage in and extend through these holes 69 to dig into the cable jacket 12, through the holes 69 and, thereby, achieve the strain relief.

Figure 39:
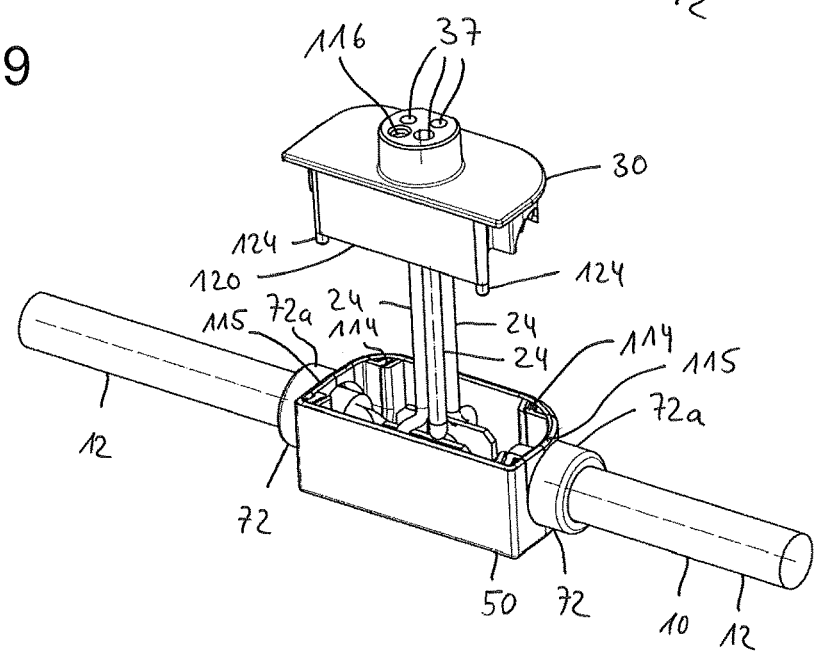
FIG. 39 is a perspective view of the assembly of FIG. 38, with the lower housing half about to be placed on the upper housing half.

Referring to FIG. 39, the lower housing half 30 is then placed on the upper housing half 50 and plugged into the latter, while the wires 24 of the drop line 26 are threaded through the holes 37 in the connection sleeve 36 to be led to the outside. The lower housing half 30 has strain relief teeth 48 which in the present example directly dig into the cable jacket 12 on the inner side of the collar 114. For this purpose, the collar 114 is bulged axially outward on the edge 115 facing the lower housing half 30. After assembly of the connector housing 8, including the two housing halves 30, 50 and the two cable receiving sleeves 72 assembled in form-fitting manner at the end faces 42, 62 of the connector housing 8, a substantially closed connector housing 8 is obtained from prefabricated plastic parts, which completely encloses the wire connection points 29. In this state, the connector housing 8 is still hollow inside.

Figure 40:
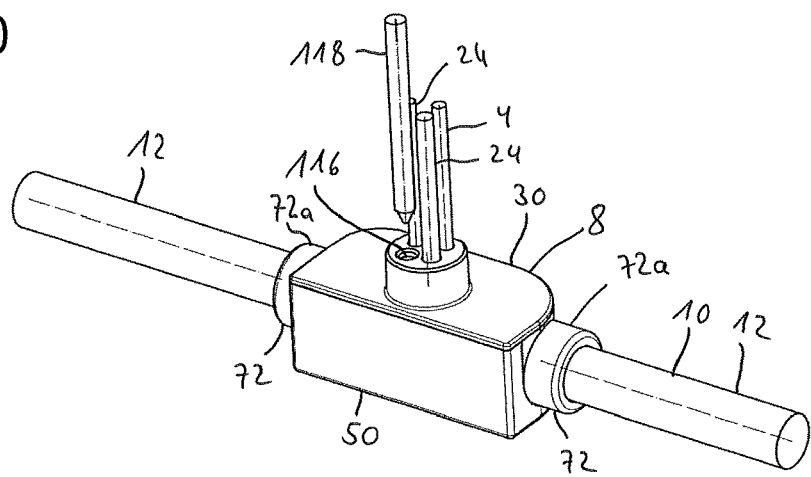
FIG. 40 is a perspective view of the assembly of FIG. 39, with the connector housing assembled and with an injection nozzle about to be introduced.

Referring to FIG. 40, the connector housing 8 has an injection hole 116, namely in the connection sleeve 36 adjacent to the holes 37 for the wires 24 of the drop line 26 in the present example, into which an injection nozzle 118 can be introduced into the connector housing 8 once the connector housing 8 has been assembled. The injection nozzle 118 can then be used to fill the connector housing 8 with the plastic potting compound. In the present embodiment, the step of filling with plastic potting compound will be sufficient to allow for adequate tightness. Additional overmolding is not necessary, but should not be excluded, however.

Referring to FIGS. 34 to 40, the lower housing half 30 provides a cover portion for the upper housing half 50 and has lateral portions 120 engaging in the upper housing half 50. Furthermore, the upper housing half 50 has inner integrally formed press-fitting sleeves 122 into which complementary press-fitting pins 124 of the lower half 30 engage to be press-fitted to the press-fitting sleeves 122. As a result, a reliable connection of the two housing halves 30, 50 is achieved.

In all embodiments, the cable receiving sleeves 72 that are separately formed or integrated with the two housing halves 30, 50 define cable grommets 72a which extend from the two end faces 42, 62 of the two joined housing halves 30, 50 or the assembled connector housing 8 and enclose and accommodate the gaskets 80.

The gaskets 80, annularly enclosed by cable grommets 72a, seal against the cable jacket 12 with their inner contour, and seal against the inner surface of the cable grommets 72a with their outer contour. Preferably, the external cable grommets 72a accommodate the gaskets 80 for sealing the connector housing 8 at the cable openings and optionally, at least partially, the strain relief means 48, 68. In the first to third embodiments of the present disclosure, the two opposing cable grommets 72a are provided by the cooperation of the two half shells 44, 64 with the joining sleeve 70.

It will be apparent to those skilled in the art that the embodiments described above are given by way of example only, and that the present disclosure is not limited thereto, but may be varied in various ways without departing from the scope of the claims. The present disclosure has, in particular, been explained above with reference to embodiments which comprise a T-shaped cable-to-cable connection, in which an end of a branch or drop line is connected to an intermediate portion of a cable, optionally without severing the wires of the cable. However, it is also possible to produce a straight connection of two cable ends, or to connect one cable end to contact elements of a plug-in connector. Accordingly, in the present disclosure the term connector 6 has to be understood as meaning not only releasable connectors, such as plug-in connectors, but also factory-made permanently assembled connection elements for electrical lines, which cannot be disconnected nondestructively, such as those illustrated above. It will be appreciated that space-related terms such as upper and lower, for example, with respect to the two housing halves 30, 50, are to be understood illustratively with regard to the mounting on an upper side of the inverter 106. It will also be appreciated, that features of the upper and lower housing halves, such as the longitudinal and transverse ribs and/or the strain relief teeth, may be interchanged. It will also be appreciated that the features, irrespective of whether disclosed in the specification, the claims, the figures, or otherwise, define essential components of the present disclosure also individually, even if they are described together with other features.

The invention claimed is:

1. An electrical cable assembly with a connector, comprising:
   at least one electrical cable with a cable jacket and one or more wires,
      wherein the cable jacket is made of a crosslinked plastic material, and
      wherein the cable is stripped in the region of the connector and the wires are stripped to expose and electrically connect the wires at respective wire connection points;
   at least a first and a second housing part, which in an assembled state are joined together to define a dielectric connector housing enclosing the wire connection points;
      wherein the connector is configured as a tee connector;
      wherein the connector housing has a first cable opening and a second opposite cable opening where the cable enters on one side of the wire connection points and exits on another side of the wire connection points;
      wherein the connector housing comprises first strain relief means provided at the first cable opening and second strain relief means provided at the second cable opening, wherein the first strain relief means dig into the crosslinked plastic material cable jacket on the one side of the wire connection points and the second strain relief means dig into the crosslinked plastic material cable jacket on the other side of the wire connection points, when the first and second housing parts are joined together; and
      wherein the first or second housing part has a connection sleeve projecting from the respective housing part transversely to the cable, and wherein the connection sleeve defines at least one lateral inlet opening for wires of a drop line; and
   said wires of the drop line entering the connector housing transversely to the cable through the at least one lateral inlet opening, wherein the wires of the drop line have ends at which the insulation of the wires is stripped and the stripped ends of the wires of the drop line are permanently electrically connected inside the connector housing with the respectively associated wires of the cable in the form of a tee branch.

2. The cable assembly as claimed in claim 1, wherein in the assembled state the connector housing has at least one cable opening which is defined by a cable receiving sleeve on an end face of the connector housing which encloses the cable at the cable opening like a sleeve.

3. The cable assembly as claimed in claim 2, wherein in the assembled state the cable receiving sleeve projects outwardly from an end face of the connector housing in order to form an external cable grommet on the connector housing.

4. The cable assembly as claimed in claim 2, wherein the strain relief means is formed integrally with an inner surface of the connector housing in the region of the cable receiving sleeve.

5. The cable assembly as claimed in claim 2, wherein the cable receiving sleeve is formed by a first half-shell of the first housing part and a second half-shell of the second housing part.

6. The cable assembly as claimed in claim 5, comprising at least one joining sleeve which in the assembled state is fitted on the cable receiving sleeve thereby pressing together the first and second half-shells so as to form the cable receiving sleeve and thus holding together the first and second housing parts.

7. The cable assembly as claimed in claim 6, wherein the joining sleeve is at least one of press-fitted, latched, or screwed onto the cable receiving sleeve.

8. The cable assembly according to claim 5, wherein the strain relief means is integrally formed with the inner surface of the first and second half-shells so as to dig into the cable jacket when the first and second half-shells are pressed together.

9. The cable assembly according to claim 1, comprising a first and second cable receiving sleeve which are each formed as separate parts from the connector housing, and which are engaged in at least one of the first or the second housing part at a first and second end face of the connector housing, respectively, when the first and second housing parts are joined together; and a first and second gasket which seal the cable jacket against an inside of the first and second separate cable receiving sleeve, respectively.

10. The cable assembly as claimed in claim 9, wherein the cable receiving sleeve has holes along a circumference thereof, and wherein the strain relief means extends inwards through the holes to dig into the cable jacket.

11. The cable assembly according to claim 1, comprising a gasket which seals the cable jacket against the cable receiving sleeve.

12. The cable assembly according to claim 1, comprising a gasket which is disposed inside the cable receiving sleeve or inside the joining sleeve.

13. The cable assembly according to claim 1, wherein the first or second housing part has longitudinal ribs on its inner surface, which define compartments for the wires within the connector housing between the longitudinal ribs.

14. The cable assembly as claimed in claim 13, wherein the other housing part has transverse ribs on its inner surface, which in the assembled state overlap with the longitudinal ribs in a direction transverse to the cable so as to individually urge the wires into the respective associated compartment and to retain them therein in the assembled state.

15. The cable assembly according to claim 1, wherein the connector housing is substantially completely overmolded by a plastic material.

16. The cable assembly according to claim 1, comprising a first and second cable receiving sleeve, which are engaged in at least one of the first or the second housing part at a first and second end face of the connector housing, wherein the cable receiving sleeves have holes along a circumference thereof, and wherein the strain relief means extends inwards through the holes to dig into the cable jacket.

17. A trunk line cable assembly for connecting a module inverter placed in the proximity of a photovoltaic module, comprising:
an electrical cable with a cable jacket and one or more wires, wherein the cable is stripped in the region of the electrical connector and the wires are stripped to expose and electrically connect the wires at respective wire connection points;
at least a first and a second housing part, which in the assembled state are joined together to define a dielectric connector housing enclosing the wire connection points; and
wherein the connector housing has a cable inlet opening and a cable outlet opening opposite to the cable inlet opening through which the cable enters the connector housing on a first end and exits on an opposite, second end;
wherein the connector housing has a second inlet opening through which, in an assembled state, wires of a drop line enter the connector housing and are electrically connected inside the connector housing with the respectively associated wire of the cable in the form of a tee branch;
wherein the wires of the drop line are connectable to a module inverter;
wherein strain relief means for the cable are provided at the cable inlet opening and at the cable outlet opening, which are effective when the first and second housing parts are joined together; and
wherein further electrical connectors are mounted at the two ends of the cable facing away from the connector housing for interconnecting a plurality of the trunk line cable assemblies to form a string.

18. An assembly comprising a module inverter and the trunk line cable assembly according to claim 17 connected thereto through wires of a drop line;
wherein the trunk line cable assembly is connected to the module inverter;
wherein the first or second housing part has a connection sleeve projecting from the respective housing part transversely to the cable,
wherein the connection sleeve defines one or more inlet openings for the wires of the drop line and, in the assembled state, extends through an opening into the housing of the module inverter to lead the wires of the drop line into the module inverter for being connected to an AC output of the module inverter.

19. A photovoltaic system comprising a plurality of photovoltaic modules each including a module inverter;
wherein a respective trunk line cable assembly according to claim 17 is connected to each module inverter; and
wherein the trunk line cable assemblies are interconnected into a string to form an AC cabling for the photovoltaic modules.

20. A method for producing an electrical cable assembly with a connector configured to connect a module inverter by a drop line, comprising the steps of:
providing an electrical cable with a cable jacket and with one or more wires with wire insulations;
providing first and second mating housing parts with strain relief means for the cable;
stripping a portion of the cable jacket;
partially removing the wire insulations in the area of the stripped jacket in order to expose the wires;
providing a drop line with one or more wires;
stripping a terminating end of the one or more wires of the drop line;

electrically connecting the one or more wires of the drop line to the respective exposed one or more wires of the electrical cable to produce one or more wire connection points;

inserting a portion of the cable including the wire connection points into the first or second housing part;

placing the other housing part thereon and joining together the first and second housing parts so as to form a dielectric connector housing enclosing the wire connection points, wherein the strain relief means dig into the cable jacket when the first and second housing parts are firmly joined together.

21. The method as claimed in claim 20, wherein a respective gasket is mounted onto the cable jacket at both ends of the connector housing and is placed on both sides of the wire connection points, and wherein joining sleeves or cable receiving sleeves are slidingly fitted over the gaskets such that in the assembled state the gaskets seal against the cable jacket on the inner side and against the associated joining sleeve or the associated cable receiving sleeve on the outer side.

22. An electrical cable assembly with a connector, comprising:
at least one electrical cable with a cable jacket and one or more wires, wherein the cable is stripped in the region of the connector and the wires are stripped to expose and electrically connect the wires at respective wire connection points; and at least a first and a second housing part, which in an assembled state are joined together to define a dielectric connector housing enclosing the wire connection points;

wherein the connector housing comprises strain relief means for the cable which are effective when the first and second housing parts are joined together;

wherein the connector housing has at least one cable opening which is defined by a cable receiving sleeve on an end face of the connector housing, which encloses the cable at the at least one cable opening like a sleeve;

wherein the cable receiving sleeve is formed as a separate part from the connector housing, and which is engaged in at least one of the first or the second housing part at an end face of the connector housing when the first and second housing parts are joined together; and wherein the cable receiving sleeve has holes along a circumference thereof, and wherein the strain relief means extends inwards through the holes to dig into the cable jacket.

23. The cable assembly according to claim 22,
wherein the connector is configured as a tee connector;
wherein the connector housing has a first cable opening and a second opposite cable opening where the cable enters on one side of the wire connection points and exits on the other side of the wire connection points; and wherein wires of a drop line enter the connector housing transversely to the cable through a lateral inlet opening to be electrically connected inside the connector housing with the respectively associated wire of the cable in the form of a tee branch.

24. The cable assembly as claimed in claim 23, wherein the first or second housing part has a connection sleeve projecting from the respective housing part transversely to the cable, and wherein the connection sleeve defines the inlet opening for the wires of the drop line.

25. The cable assembly according to claim 22, comprising a gasket which seals the cable jacket against the cable receiving sleeve.

26. The cable assembly according to claim 22, comprising a gasket which is disposed inside the cable receiving sleeve or inside the joining sleeve.

27. The cable assembly according to claim 22, wherein the first or second housing part has longitudinal ribs on its inner surface, which define compartments for the wires within the connector housing between the longitudinal ribs.

28. The cable assembly as claimed in claim 22, wherein the other housing part has transverse ribs on its inner surface, which in the assembled state overlap with the longitudinal ribs in a direction transverse to the cable so as to individually urge the wires into the respective associated compartment and to retain them therein in the assembled state.

29. The cable assembly according to claim 22, wherein the connector housing is substantially completely overmolded by a plastic material.

* * * * *